United States Patent Office 3,639,431
Patented Feb. 1, 1972

3,639,431
PRODUCTION OF BENZOTRIAZOLES
Lucian W. McTeer, South Charleston, and Robert G. Kelso, St. Albans, W. Va., assignors to Union Carbide Corporation
No Drawing. Filed May 24, 1968, Ser. No. 731,718
Int. Cl. C07d 55/04; C23f 11/14
U.S. Cl. 252—390                                3 Claims

ABSTRACT OF THE DISCLOSURE

In a process for recovering benzotriazole that is produced by reacting an ortho-phenylenediamine with nitrous acid in aqueous media, the improvement which comprises adding a polyhydroxy compound to crude benzotriazole separated from the aqueous phase of the product mixture and codistilling the benzotriazole and the polyhydroxy compound, thereby increasing the yield and lessening the danger of explosive decomposition of the benzotriazole during distillation. In a preferred embodiment of the improvement a substantially water-insoluble alkanol is initially added to the aqueous product mixture containing the benzotriazole in order to facilitate the separation of the benzotriazole from the aqueous layer of the product mixture.

---

The invention relates to an improvement of the process for producing benzotriazoles. In particular, the invention relates to an improvement in the process for recovering benzotriazoles that have been prepared by reacting in aqueous media, ortho-phenylenediamine with nitrous acid, the nitrous acid being generated in situ by reacting an acid with a salt of nitrous acid, e.g., sodium nitrite. The improvement comprises adding a polyhydroxy compound to crude benzotriazole separated from the aqueous phase of the product mixture and codistilling the benzotriazole and the polyhydroxy compound. In a preferred procedure a substantially water-insoluble alkanol is first added to the product mixture containing the benzotriazole in order to facilitate separation of the organic phase from the aqueous phase. The improved recovery procedure not only results in a significant increase in yield, but, more importantly, minimizes the chance of explosive decomposition of the benzotriazole during distillation.

Benzotriazole, and lower alkyl-substituted benzotriazoles, find wide use as corrosion inhibitors in anti-freeze compositions and cleaning compounds, and as a photographic anti-fogant and light stabilizer. The conventional method of preparation of benzotriazole consists of the diazotization of orthophenylenediamine with nitrous acid, followed by condensation in accordance with the reaction:

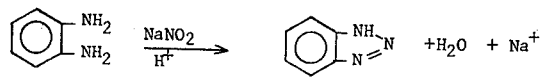

As indicated in the foregoing reaction, the nitrous acid is normally generated in situ from an alkali metal nitrite and an acid. Large quantities of water are used in the reaction mixture in order to solubilize the alkali metal nitrite. The crude product mixture normally separates into two layers, with the organic phase containing benzotriazole as the bottom layer and the aqueous phase as the top layer. The benzotriazole product can be recovered from the crude reaction mixture by decantation of the aqueous layer and repeated crystallization of the organic layer from benzene or water, or by fractional distillation. Neither method is entirely satisfactory because, first, the crystallization method gives a rather poor yield, and second, the distillation method carries an attendant explosion hazard. In fact, in 1956 a disastrous explosion occurred during the vacuum distillation of benzotriazole on a commercial scale (reference, Chem. and Engineering News, 34, page 2450, 1956). The present invention provides a procedure for recovering benzotriazole from a water-containing reaction mixture wherein the benzotriazole was produced by the conventional diazotization of an ortho-phenylenediamine, followed by condensation of the diazotized material.

The invention comprises a process for recovering benzotriazoles from a water-containing reaction mixture which comprises the steps of (1) separating the organic layer containing substantially all of the benzotriazole from the aqueous layer, (2) adding a polyhydroxy compound to the said organic layer containing the benzotriazole, and (3) distilling said organic layer and recovering thereby a solution of benzotriazole in said polyhydroxy compound.

The preferred procedure of this invention comprises the steps of (1) adding a substantially water-insoluble alkanol to said reaction mixture, (2) thereafter separating the organic layer containing said alkanol and substantially all of the benzotriazole from the aqueous layer, (3) adding a polyhydroxy compound to the said organic layer containing the benzotriazole, and (4) distilling said organic layer and recovering thereby a solution of benzotriazole in said polyhydroxy compound.

The benzotriazoles that are produced by the process of this invention are compounds that can be represented by Formula I:

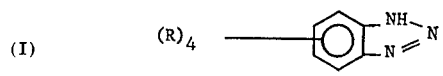

wherein R represents hydrogen or lower alkyl of, for example, 1 to 3 carbon atoms, provided that the total number of carbon atoms in all of the R variables shall not exceed 8. The benzotriazole is produced from the corresponding ortho-phenylenediamine with nitrous acid which is generated in situ by the reaction of an alkali metal nitrite and an acid, normally acetic acid. The reaction mixture contains a considerable amount of water which is used as a solvent for the alkali metal nitrite. The normal procedure is to react one mole of an ortho-phenylenediamine with from 1 to 1.1 moles of alkali metal nitrite in the presence of 2 moles of acetic acid or other acid. This procedure is well known in the literature, for instance, reference is made to Damschroder et al., Organic Syntheses Coll. Vol. III, page 106. (Organic Syntheses, John Wiley and Sons, Inc., New York, N.Y., 1955).

The present invention comprises a process for recovering the benzotriazole from the crude reaction mixture produced by the above-described known reaction.

In the first step of the recovery process of the invention, the organic layer containing benzotriazole is separated from the aqueous layer of the reaction mixture. The separation of the two layers can be effected by customary methods such as by decantation of the aqueous layer followed by several water washings of the organic layer to remove the last traces of alkali metal salts and acid.

In the preferred procedure of the invention the first step of the recovery process, i.e., before the separation step described above, comprises the addition to the crude reaction mixture of a substantially water-insoluble alkanol. Alkanols containing from 5 up to about 16 carbon atoms are useful in the invention. Such alkanols include pentanol, hexanol, heptanol, octanol, nonanol, decanol, undecanol, dodecanol, hexadecanol and the like. Of course, the several isomers of the above exemplified alkanols can also be used in the invention. The preferred alkanols are those having from 6 to 10 carbon atoms; and the octanols, such as 2-ethylhexanol, are particularly preferred. The amount of alkanol employed can vary widely. The minimum amount required is that which will just dissolve all of the benzotriazole. This, of course, can vary considerably depending upon the particular alkanol and benzotriazole involved. There is no critical maximum amount of alkanol if operability alone is considered. However, economic considerations are such that the preferred amounts of alkanol to be employed are those that will result in a benzotriazole concentration in the alkanol of from about 5 to about 50 weight percent.

After separation of the layers, the next step of the recovery process of the invention comprises adding to the organic layer containing the benzotriazole (and the alkanol in the preferred procedure) a polyhydroxy compound, or a mixture of polyhydroxy compounds, having an average boiling point near enough to that of the particular benzotriazole employed so that the vapors resulting from boiling a mixture of the polyhydroxy compound and the particular benzotriazole will contain on the average substantially the same concentration by weight of polyhydroxy compound and benzotriazole as that prevailing in the boiling liquid being distilled. Such polyhydroxy compounds that can be used include erythritol; 2-ethyl-1,3-hexanediol; 1,1,1-trimethylolpropane; the polyalkylene glycols having molecular weights averaging from about 100 to about 300, and preferably from about 150 to about 250; and the like. The polyethylene glycols are the preferred polyhydroxy compounds. The polyhydroxy compound is used in an amount such that the final product, i.e., a solution of benzotriazole in said polyhydroxy compounds, will contain from about 5 to about 50, and preferably from about 15 to about 35 weight percent of benzotriazole in said polyhydroxy compound.

The polyhydroxy compound need not be a pure compound having a definite boiling point. Indeed, a particularly, efficacious method of practicing the invention is to employ a mixture of polyhydroxy compounds, some of which boil below, some almost exactly with, and some above the particular benzotriazole involved. As is well known to those skilled in the art, if such a mixture is distilled without rectification its initial boiling point will be higher than that of the lowest boiling component and the final boiling point will be lower than that of the highest boiling component.

After the addition of the polyhydroxy compound, the mixture of benzotriazole and polyhydroxy compound (and alkanol, if present) is fractionally distilled to recover the benzotriazole as a solution in the polyhydroxy compound. The fractional distillation can be done by standard procedures, including the use of a vacuum.

The benzotriazoles that are produced by the process of this invention are highly useful compositions. For example, one of the more important commercial uses of benzotriazoles is as a corrosion inhibitor in anti-freeze solutions. For such utility, the solution of benzotriazole in the polyhydroxy compound can be used without further processing. However, if it is desired to recover the benzotriazole as a pure compound from the solution in the polyhydroxy compound, that can be done quite readily by recrystallization from water by well known procedures. The examples which follow illustrate the invention:

In the examples, the final product, consisting of a solution of a benzotriazole in a polyalkylene glycol, was analyzed by the method of Hennart and Merlin [Chim. anal. 40, 87 (1958)]. The procedure consisted of titrating a solution of a benzotriazole in dimethylformamide with 0.1 normal sodium methoxide dissolved in a 1:3 volume mixture of methanol and benzene. The use of Alizarin Yellow G as an indicator was a departure from the original procedure where Azo Violet was employed as the indicator. Application of the foregoing procedure to an authentic sample of benzotriazole resulted in a quantitative assay.

In Example 1 the conventional method of conducting the reaction is employed. In Example 1 there is demonstrated codistillation of benzotriazole and a polyalkylene glycol, but not the use of an alkanol to enhance separation of the aqueous and organic phases of the crude reaction product. In Examples 2, 3, and 4 both the use of an alkanol and codistillation with a polyalkylene glycol are demonstrated.

EXAMPLE 1

A solution was prepared from 300 grams of water, 120 grams of acetic acid, and 108 grams of ortho-phenylenediamine. A second solution was prepared by dissolving 75 grams of sodium nitrite in 120 grams of water. Both solutions were cooled to 5° C. and then mixed by pouring them together suddenly and completely. The common container was kept in an ice bath and the total mixture was stirred gently. In 30 seconds after mixing the temperature of the mixture had risen to 25° C. In 60 seconds after mixing the temperature of the mixture reached a maximum of 85° C. and then started to decline. At this point, the mixture was removed from the ice bath and was allowed to cool gradually, over one hour, to 35° C. As the mixture cooled, a brown oily layer formed as the bottom layer. A thin scum of oil layer also appeared on top of the aqueous layer. The crude reaction mixture then was returned to the ice bath for two hours, during which time the entire mixture solidified. The crude product then was transferred to a Buchner funnel and about 500 grams of water was removed. The solid was washed with 400 grams of ice water and then with 200 grams of ice water and was sucked as dry as possible.

To a simple gooseneck apparatus there was charged 174 grams of the damp salt and 450 grams of polyethylene glycol having an average molecular weight of about 200. The absolute pressure was reduced to 100 millimeters, heat was applied to the kettle, and water was removed as distillate. The absolute pressure was gradually reduced to two millimeters and by the time the kettle temperature had reached 140° C., all evolution of water had ceased. Thereafter, benzotriazole and polyethylene glycol were codistilled at a vapor temperature ranging from 125° to 203° C. and a kettle temperature ranging from 140° to 223° C., all at an absolute pressure of about two millimeters of mercury. The total distillate amounted to 490 grams, while the kettle residue was 63 grams. The homogeneous distillate had a color of 4 Gardner and contained 20.5 percent of benzotriazole. The yield of benzotriazole, based on ortho-phenylenediamine, was 85 percent.

The polyethylene glycol 200 employed had the following composition, expressed as percent by weight: ethylene glycol, 1.5; diethylene glycol, 5.0; triethylene glycol, 18.1; tetraethylene glycol, 25.1; pentaethylene glycol, 22.2; hexaethylene glycol, 15.0; and higher molecular weight polyethylene glycols, 13.1.

EXAMPLE 2

The reaction procedure of Example 1 was repeated. After the crude reaction mixture had cooled to 30° C., 600 grams of n-hexanol was added and the entire mixture was agitated thoroughly. The n-hexanol combined with the tarry product layer and became the upper layer of a heterogeneous system. The aqueous layer was drained from the system and discarded. The remaining organic material then was washed with 500 grams of water, which also was drained from the system and discarded. To the remaining organic layer then was added 450 grams of polyethylene glycol 200, and the resulting homogeneous solution was charged to a 10-plate still. Here the n-hexanol and 93 grams of water were stripped off at a vapor temperature of 29° C. to 85° C. and a kettle temperature of 44° to 202° C. at an absolute pressure of 30 millimeters to 2 millimeters of mercury.

The remaining kettle residue, which amounted to 498 grams, was charged to a simple gooseneck apparatus and was distilled without rectification at an absolute pressure of about two millimeters of mercury. A log of this distillation is as follows:

| | Vapor temp., °C. | Kettle temp., °C. | Weight, grams | Weight percent benzotriazole |
|---|---|---|---|---|
| Fraction No.: | | | | |
| 1 | 130–175 | 155–185 | 141 | 26.5 |
| 2 | 175–185 | 185–196 | 128 | 34.5 |
| 3 | 185–207 | 196–222 | 130 | 23.7 |
| 4 | 207–225 | 222–241 | 46 | 4.3 |
| Residue | | | 53 | |

The average concentration of benzotriazole in the total combined distillate was 25.7 percent by weight. Based on ortho-phenylenediamine, the yield was 95.1 percent.

EXAMPLE 3

A mixture was prepared from 300 grams of water, 120 grams of acetic acid, and 122 grams of a mixture of 2-methyl- and 3-methyl-ortho-phenylenediamine. First the water and acetic acid were combined and then the diamines were added. As the diamines went into solution a slight amount of heat was generated and the temperature of the solution rose to 40° C. A second mixture was prepared by dissolving 75 grams of sodium nitrite in 120 grams of water. The first solution was cooled to 25° C. and was stirred gently while the second solution was fed thereto. About one-fourth of the second solution was fed over a period of about five minutes, during which the temperature rose to 75° C. Thereafter the temperature was maintained between 75° and 90° C. by controlling the rate of feed of the second solution and by the application of external cooling. A total time of about 20 minutes was required to complete the mixing of the two solutions. After the mixing was complete, the crude reaction mixture was cooled to 30° C. As the mixture cooled, a thick, tarry substance formed as the bottom layer of the heterogeneous system. A thin scum of oily material also was present on top of the aqueous layer.

To the crude reaction mixture there was added 117 grams of 2-ethylhexanol and the entire mixture was agitated thoroughly. The oily product layer combined with the 2-ethylhexanol and became the top layer of the heterogeneous system. The aqueous layer was drained from the system and discarded. The organic layer then was washed with 400 grams of water, which also was drained from the system and discarded.

To the resulting organic layer there was added 375 grams of polyethylene glycol 200, and the resulting homogeneous solution was charged to the kettle of a 10-tray column. There the contained 2-ethylhexanol and 28 grams of water were stripped off at a vapor temperature of 25° to 100° C. and a kettle temperature of 60° to 200° C. at an absolute pressure of 10 millimeters to 3 millimeters. The residue, which amounted to 491 grams then was charged to a simple gooseneck apparatus and was distilled without rectification at an absolute pressure of about one millimeter of mercury, with the following results.

| | Vapor temp., °C. | Kettle temp., °C. | Weight, grams | Wt. percent methyl benzotriazoles |
|---|---|---|---|---|
| Fraction No.: | | | | |
| 1 | 130–165 | 162–169 | 14 | 8.3 |
| 2 | 165–188 | 169–191 | 105 | 17.0 |
| 3 | 188–202 | 191–204 | 109 | 30.3 |
| 4 | 202–207 | 204–211 | 132 | 36.4 |
| 5 | 207–232 | 211–245 | 93 | 17.3 |
| Residue | | | 36 | |

The total combined distillate contained an average of 25.8 percent by weight of methyl benzotriazoles. Based on methyl ortho-pheneylenediamines, the yield was 87.1 percent.

EXAMPLE 4

A mixture was prepared from 300 grams of water, 120 grams of acetic acid, and 136 grams of 4,5-dimethyl-orthophenylene-diamine. It was necessary to heat the mixture to 60° C. in order to effect complete solution of the diamine. This solution was maintained at 60° C. and to it was fed a second solution composed of 75 grams of sodium nitrite in 120 grams of water. Temperature of the mixture rose rapidly to 80° C., where it was maintained by controlling the rate of feed of the second solution and by the application of external cooling. The total time required to complete feeding of the second solution was 17 minutes.

To the resulting crude reaction mixture, maintained at a temperature of 90° C., there was added 468 grams of 2-ethyl-hexanol, and the mixture was agitated thoroughly. The mixture then was cooled to 30° C. and the aqueous (bottom) layer was discarded. The remaining organic layer was combined with 562 grams of polyethylene glycol 200 and the resulting homogeneous solution was charged to a 10-plate column. Here the 2-ethylhexanol and 39 grams of water were distilled off at a vapor temperature of 50° to 103° C. and a kettle temperature of 88° to 210° C. at an absolute pressure of 100 millimeters to 2 millimeters of mercury.

The residue from hte foregoing stripping distillation was charged to a gooseneck apparatus and was distilled without rectification at an absolute pressure of about two millimeters of mercury, as per the following record.

| | Vapor temp., °C. | Kettle temp., °C. | Weight, grams | Weight percent dimethyl benzotriazole |
|---|---|---|---|---|
| Fraction No.: | | | | |
| 1 | 131–183 | 164–200 | 152 | 9.0 |
| 2 | 183–190 | 200–207 | 154 | 27.0 |
| 3 | 190–208 | 207–220 | 147 | 38.0 |
| 4 | 208–220 | 220–243 | 255 | 10.2 |
| Residue | | | 125 | |

Fractions 1 and 4 were fluid at 25° C., but fractions 2 and 3 were solid below about 50° C. The average concentration of dimethyl benzotriazole in the total combined distillate was 19.3 percent by weight. Based on the starting dimethyl orthophenylenediamine, the yield was 92 percent.

To 500 grams of boiling water there was added 102 grams of Fraction 3 from the foregoing distillation. The mixture was boiled for 10 minutes and then cooled to 25° C. The mixture was filtered and the precipitate was washed three times with 500-gram portions of hot (70° C.) water. The resulting solid was then added to 500 grams of boiling water and boiling of the mixture was continued for one-half hour. The mixture then was cooled to 25° C. and filtered. The filtrate was washed with 250 grams of cold water and then was dried on a Buchner funnel and finally in a desiccator at 60° C. and under vacuum. The final product was a faintly yellow solid weighing 34 grams. This material had a sharp melting point of 151° C. and assayed 99.2 percent as dimethyl benzotriazole.

What is claimed is:

1. In a process which comprises reacting orthophenylenediamines with nitrous acid in an aqueous medium to produce a reaction product mixture which contains benzotriazole as the desired product, the improvement which comprises:
   (a) allowing the resulting reaction product mixture to separate into (i) an aqueous phase, and (ii) an organic phase which is rich in said benzotriazoles;
   (b) separating said organic phase from said aqueous phase;
   (c) adding a polyhydroxy compound to the separated organic phase, said polyhydroxy compound being soluble with said benzotriazoles and having an average boiling point substantially close to the boiling point of said benzotriazoles such that the concentration of the vapors which result during the distillation of said separated organic phase containing said polyhydroxy compound is substantially the same as the concentration of said separated organic phase containing said polyhydroxy compound being distilled; and (d) distilling said separated organic phase containing said polyhydroxy compound to obtain said benzotriazoles as a solution in said polyhydroxy compound.

2. The process of claim 1 wherein said polyhydroxy compound is of the group consisting of erythritol, 2-ethyl-1,3-hexanediol, 1,1,1-trimethylolpropane, the polyalkylene glycols which have an average molecular weight of from about 100 to about 300, and mixtures thereof.

3. In a process which comprises reacting orthophenylenediamine with nitrous acid in an aqueous medium to produce a reaction mixture which contains benzotriazole as the desired product, the improvement which comprises:

(a) adding a $C_5$–$C_{16}$ alkanol to the resulting reaction product mixture;

(b) allowing step (a) above to separate into (i) an aqueous phase, and (ii) an organic phase which is rich in said benzotriazole and said $C_5$–$C_{16}$ alkanol;

(c) separating said organic phase from said aqueous phase;

(d) adding polyethylene glycol which has an average molecular weight of from about 150 to about 300 to the separated organic phase; and (e) distilling the resulting admixture of step (d) above thus recovering said benzotriazole as a solution in said polyethylene glycol.

References Cited
UNITED STATES PATENTS 3,334,054  8/1967  Howard et al. _____ 260—308

ALTON D. ROLLINS, Primary Examiner

U.S. Cl. X.R.

260—308 B